No. 815,648. PATENTED MAR. 20, 1906.
S. SLAGLE.
EYEGLASS LENS.
APPLICATION FILED APR. 26, 1905.
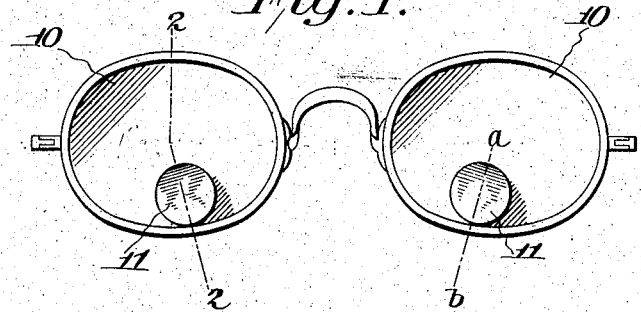
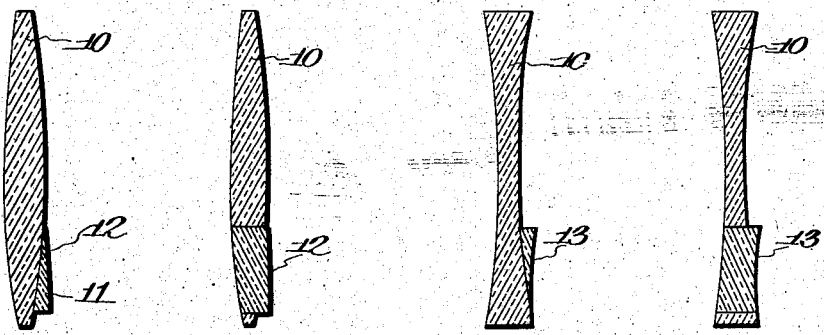
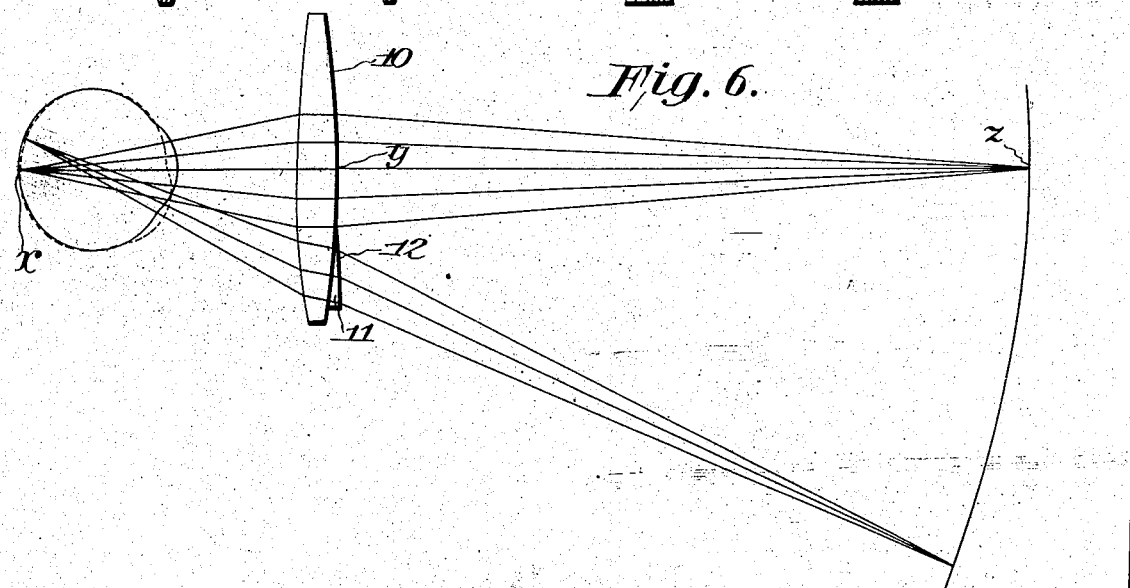
Sylvester Slagle, Inventor

UNITED STATES PATENT OFFICE.

SYLVESTRE SLAGLE, OF STATE COLLEGE, PENNSYLVANIA.

EYEGLASS-LENS.

No. 815,648.  Specification of Letters Patent.  Patented March 20, 1906.

Application filed April 26, 1905. Serial No. 257,459.

*To all whom it may concern:*

Be it known that I, SYLVESTRE SLAGLE, a citizen of the United States, residing at State College, in the county of Center and State of Pennsylvania, have invented a new and useful Eyeglass-Lens, of which the following is a specification.

This invention relates to eyeglasses or spectacles of that general class in which the lenses are arranged for both distant vision and reading and similar purposes. The glasses most commonly employed for this purpose are sectional lenses in which the upper section is made especially for distant vision and the lower section for close work. These glasses are invariably used by persons of forty years of age or more where presbyopia has already set in. They are useless and injurious to eyes where the power of accommodation still remains, for the reason that the involuntary action of the ciliary muscles will alter the focal power of the crystalline lens of the eye and the motor-muscles will cause the eyes to slightly converge when an effort is made to read or examine work at a short distance. This results in a prismatic effect of the lenses, causes severe strain, and in many cases the line of vision or the focal line is not directed from the macula through the lens of the eye to the work, but to a point either above or below the work, resulting in imperfect vision. The sectional lenses referred to are invariably made of different focal distances, the upper lenses being designed for the correction of hypermetropia, myopia, or astigmatism, while the lower lenses have a different focal length or distance for reading purposes, or, in other words, the eye, owing to presbyopia, remains constant, there being no movement of the ciliary muscle, and the line of vision is directed through the upper lens of a predetermined focal length to correct the ametropic condition, or through the lower lenses of shorter focal distance for reading. It has also been proposed to supply glasses with short focus lenses, cemented or otherwise secured to long focus lenses; but in this case also the glasses are designed for use only on persons where presbyopia has already set in.

Up to the present time no glasses have been made for use on ametropic eyes from the ages of six to forty-five years where presbyopia has not set in and where provision is made for the correction of distant vision and to permit reading or the examination of work at a close range without disturbing the equilibrium of the motor-muscles.

The present invention is designed to provide a pair of lenses or spectacles for binocular vision, in which distant objects may be viewed, and for reading or the examination of work at a close range, the lenses being of the same focal distance, as the ciliary muscles of the eye act involuntarily to alter the shape of the crystalline lens in accordance with the focal distance of the object being viewed.

A further object of the invention is to construct lenses for binocular vision in which the main lenses are designed for the correction of hypermetropia, myopia, or astigmatism, while the auxiliary lenses are arranged and disposed with a view of neutralizing prismatic effect of the distance lenses while reading, said auxiliary lenses being further so arranged that their focal centers are nearer to each other than the focal centers of the distance-lenses in order to accommodate the involuntary convergence of the eyes when examining an object at close range.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a face view of a pair of spectacles or eyeglasses constructed in accordance with the invention. Fig. 2 is a transverse sectional view of one of the lenses on the line 2 2 of Fig. 1. Figs. 3, 4, and 5 are views similar to Fig. 2, illustrating slight modifications of the invention. Fig. 6 is a diagram illustrating the different optical centers and uniform focal distances of the lenses.

Similar characters of reference are employed to indicate corresponding parts throughout the several figures of the drawings.

The distance-lens 10 may be of the convex form (shown in Figs. 2 and 3) for the correction of hypermetropia or of concave form (shown in Figs. 4 and 5) for the correction of myopia, these lenses being of ordinary type and their optical centers being indicated at a. Each distance-lens carries an auxiliary lens 11. The auxiliary lens 11 is of a shape corresponding to the shape of the main distance-lens—that is to say, if attached to a lens having a convex face the outer face of the auxiliary lens will also be convex, as shown at 12, or if attached to a concave lens, as shown in Figs. 4 and 5, the outer face of the auxiliary lens will be concave, as shown at 13 in Figs. 4 and 5, while the inner face of each of the auxiliary lenses will correspond to the shape of that face of the main lens to which it is secured or with which it is in alinement. Thus in Figs. 2 and 4 the auxiliary lenses are shown as secured, as by cement, to the outer faces of the main lenses, and the adjacent faces of the main and auxiliary lenses are of complementary shape, so that one fits closely to the other, and the outer face of each auxiliary lens is curved on a convex line or concave line corresponding to the similar curvature of the main lens to which it is attached. In Figs. 3 and 5 the auxiliary lenses are shown as placed in openings extending through the main lenses, and in these cases the rear faces of the auxiliary lenses follow exactly the curvatures of the inner faces of the main lenses.

It will be observed that in all of the constructions illustrated the auxiliary lens tapers in thickness from one edge to a diametrically opposite point at the opposite edge, so that that portion protruding beyond the main lens forms, in effect, a half-lens. The auxiliary lenses (shown in Figs. 2 and 3) therefore, are half concavo-convex or converging meniscus lenses, with the thicker portion toward the base or lower edge of the main lens, while in Figs. 4 and 5 the auxiliary lens, or that portion of it which protrudes beyond the outer face of the main lens, is also a half-meniscus, with its thicker edge nearest the optical center of the main lens, so that with the exception of minor changes in curvature of the lens-faces the half-meniscus of Fig. 2 for a hypermetropic main lens may be applied in reverse position to a myopic main lens, such as is shown in Fig. 4, while in the lens shown in Figs. 4 and 5 the same theory is followed to the extent of placing the thicker edge of the auxiliary lens toward the base of the hypermetropic main lens and with the thicker portion of the auxiliary lens of Fig. 5 toward the optical center of a myopic lens.

The optical centers of the main lenses are at a in Fig. 1; but in viewing an object at close range the eyes will naturally converge, so that the optical centers or axes of the auxiliary lenses must be brought nearer to each other. In practice it is found best for a normal reading distance of thirty-three and one-third centimeters to arrange the optical centers of the auxiliary lenses on lines radiating from the centers a and at an angle of twenty degrees inward from the vertical planes of the optical centers a, while the auxiliary lenses occupy a position corresponding exactly to the line of vision for close work—that is to say, in the line a b, extending from the optical center a of the main lens and through the optical center of the auxiliary lens. The radial line a b extends through that diametrical plane of the auxiliary lens in which its thinnest and thickest edges are disposed, the thinnest portion being nearest the optical center a for a converging lens and distant from such optical center for a diverging lens.

Both the main and the auxiliary lenses have uniform focal distances. In using the distance-lenses x represents the macula of the retina in alinement with the center of the crystalline lens, y the focal center of the main distance-lens, and at z is the focal point or focal distance of the main lens. The arcuate line z z' represents the focal distance of both lenses, and when the eyes are turned down for close reading they will naturally converge to some extent, and if the auxiliary lenses were absent the prismatic effect of the main lenses would prevent reading or the examination of objects at close range. These auxiliary lenses, however, are so disposed as to prevent prismatic effect, and their secondary axes are such that the line of vision will be theoretically correct.

Having thus described the invention, what is claimed is

1. In eyeglasses or spectacles of the class described, an auxiliary lens carried by each main lens, the focal distance through that portion of the glasses which includes the auxiliary lens being the same as the focal distance through the main lens.

2. In eyeglasses or spectacles of the class described, an auxiliary lens carried by each main lens, and of varying thickness to correct the prismatic effect of the main lens, the focal distance through that portion of the glasses which includes the auxiliary lens being the same as the focal distance through the main lens.

3. In eyeglasses or spectacles of the class described, an auxiliary lens carried by each main lens and varying in thickness in a diametrical plane extending from one edge of the lens to the other, such diametrical plane being arranged on a line radiating from the optical center of the main lens, the focal distance through that portion of the glasses which includes the auxiliary lens being the same as the focal distance through the main lens.

4. In eyeglasses or spectacles of the class described, auxiliary lenses carried one by each of the main lenses and having their optical centers or axes nearer to each other than the optical centers or axes of the main lenses, said auxiliary lenses being graduated in thickness in diametrical planes extending from edge to edge of such auxiliary lenses, the diametrical planes being disposed on lines radiating from the optical centers of the main lenses, and the focal distance through that portion of the glasses which includes the auxiliary lenses being the same as the focal distance through the main lenses.

5. In eyeglasses or spectacles of the class described, an auxiliary lens substantially of half-meniscus form secured to the outer face of each main lens, the focal distance through that portion of the glasses which includes the auxiliary lens being the same as the focal distance through the main lens.

6. In eyeglasses or spectacles of the class described, an auxiliary lens approximately of half-meniscus form and secured to the outer face of each main lens, the thicker edge of the half-meniscus being so arranged with respect to the optical center of said main lens as to correct prismatic effects, the focal distance through that portion of the glasses which includes the auxiliary lens being the same as the focal distance through the main lens.

7. In eyeglasses or spectacles of the class described, distance and reading lenses of uniform focal distance, the optical centers of the auxiliary lenses being closer together than the optical centers of the distance-lenses.

In testimony that I claim the foregoing as my own I have hereto affixed my signature in the presence of two witnesses.

SYLVESTRE SLAGLE.

Witnesses:
JOHN WEAVER,
JNO. L. HOLMES.